United States Patent [19]
Petrick et al.

[11] 3,733,544
[45] May 15, 1973

[54] METHOD FOR EVALUATING ELECTROSTATIC PROPENSITY OF FABRICS AND SOFT SHEETING MATERIALS

[75] Inventors: John T. Petrick, Fredericksburg, Va.; Milton Bailey, Wayland, Mass.

[73] Assignee: The United States of America as represented by the Secretary of the Navy, Washington, D.C.

[22] Filed: Feb. 24, 1972

[21] Appl. No.: 229,016

[52] U.S. Cl. ................................................324/32
[51] Int. Cl. ...........................................G01r 5/28
[58] Field of Search .........................324/32, 72, 109

[56] References Cited
UNITED STATES PATENTS

| | | | |
|---|---|---|---|
| 3,364,423 | 1/1968 | Moulton | 324/32 X |
| 3,487,296 | 12/1969 | Frederick | 324/32 |
| 2,189,352 | 2/1940 | Sie Genheim | 324/32 |

*Primary Examiner*—Rudolph V. Rolinec
*Attorney*—R. S. Sciascia et al.

[57] ABSTRACT

A method and apparatus for measuring the electrostatic charge generating capacity of various materials and simulating the contact effects that result in static charge build-up on an individual. A Van de Graaff type generator is employed having a plurality of rollers. Charge is accumulated in the vicinity of at least one roller and measured at another. Two rollers and a single material belt to be tested are employed or more than two rollers and a plurality of belts may be used.

9 Claims, 2 Drawing Figures

METHOD FOR EVALUATING ELECTROSTATIC PROPENSITY OF FABRICS AND SOFT SHEETING MATERIALS

BACKGROUND OF THE INVENTION

Older methods of predicting the electrostatic behavior of various materials including, but not limited to, the natural and synthetic, fibrous and non-fibrous, woven and non-woven textiles, used the materials resistivity as a basis for prediction. Resistivity, however, discloses no information on the charge generating characteristics of the materials. Moreover, none of the previous methods predicts the charge generated on the individual by these materials or combinations of these materials. In particular this apparatus and method will predict the charge generated on an individual wearing various combinations of materials either as a garment or as an accessory. Furthermore, the method will provide a list of various materials according to their electro-positive or electro-negative properties. This list can be referred to as the triboelectric series.

Heretofore, available static electricity measuring devices have employed rubbing techniques to produce a triboelectric effect. Such techniques do not provide easily reproducible results; therefore, comparative values are difficult to obtain. Alauzet et al, U.S. Pat. No. 3,544,889 discloses an apparatus for measuring the electrostatic properties of plastic materials including a device using rollers to move an endless belt of plastic material past a charging electrode and measurement probe. However, Alauzet et al's device does not simulate the contact effects of materials normally used for clothing and apparel.

SUMMARY OF THE INVENTION

The present method and apparatus simulate and measure the contact effect that results in static charge build-up on a material and on an individual wearing a given combination of clothing. Rollers are used to move an endless belt of the material to be tested past the charging area in which the belt comes into contact with a standard material and acquires a static electric charge. As the belt moves to another roller a probe measures the charge picked up by the belt.

The standard material may circumscribe one of the rollers or it itself may form a distinct belt which contacts the material to be tested between any two given points. In addition, several belts may be employed to simulate a combination of wearing apparel and the movements of a person wearing the apparel. The probe may measure the charge directly on the material or measure the charge transferred from the material to one of the rollers. In this respect one roller may be made of a material which simulates human body electrical characteristics. The material would be chosen by comparing its position in a triboelectric series and its resistivity with human skin. In this manner the charge accumulated on an individual can be tested for a given combination of materials.

OBJECTS OF THE INVENTION

An object of the present invention is the provision of a standardized approach that precisely and accurately reproduces the contact effects of materials that result in the static charge build-up on an individual.

Another object is to provide a method that permits rapid evaluation of materials and also eliminates the need for complex clothing ensembles during testing.

A further object of the invention is the provision of test equipment which may be made small enough to be transported to any environment and yet not be effected by that environment.

Still another object is to provide a test method that permits evaluation of a wide variety of combinations of materials.

Other objects, advantages, and novel features of the present invention will become apparent from the following detailed description of the invention when considered in conjunction with the accompanying drawings.

DETAILED DESCRIPTION OF THE PREFERRED EMBODIMENTS

Figure 1:
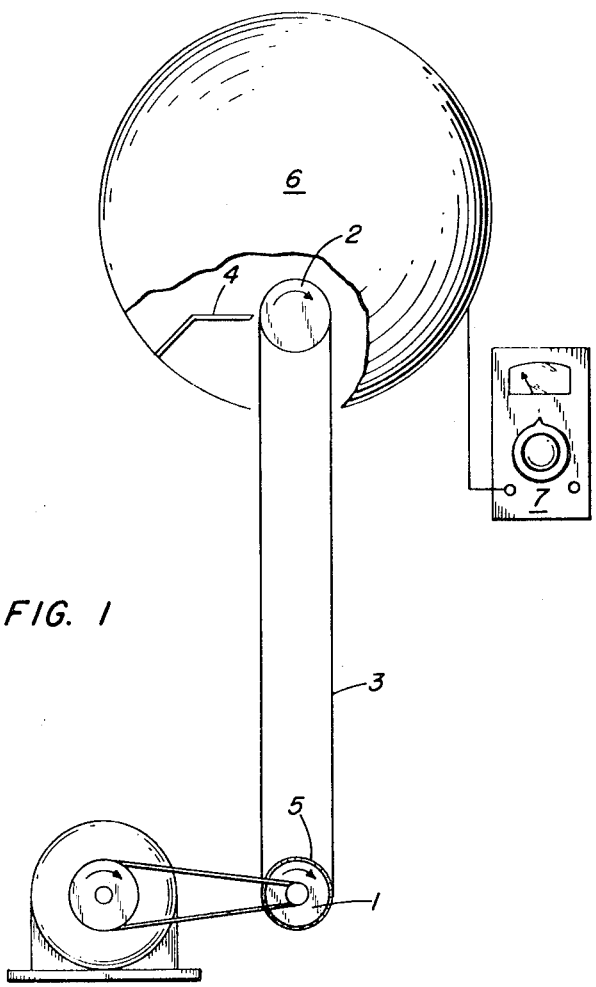
FIG. 1 is a schematic representation of a Van de-Graaff type electrostatic generator employed in accordance with the invention.

A Van de Graaff type generator is equipped with fabric belt as shown in FIG. 1. Roller 1 is driven and is a fabric covered ceramic cylinder. Roller 2 is a ceramic cylinder which is free to rotate. A fabric belt 3 is place over rollers 1 and 2. Charge collectors (not shown) may be also employed to bring charge to or from the belt 3. The present invention, however, contemplates using a standard fabric 5 covering ceramic cylinder 1. The contact and separation between belt 3 and standard fabric 5 causes a build-up of electrostatic charges on belt 3. Collector 4 is connected to a large aluminum sphere which in turn is connected to an electrometer 7.

When roller 1 is driven, belt 3 moves over roller 1 and the standard material 5 makes simple contact with the material of the belt. Fabric belt 3 then moves up to roller 2 where any charge generated during contact with roller 1 is removed by collector 4 and deposited on the sphere 6. Aluminum sphere 6 is connected to electrometer 7 which measures the charge transferred. By using various fabrics for belt 3 and a standard fabric taken from one extreme of the triboelectric series, such as wool, a measurement of the relative electrostatic propensity of the fabric belt can be made by developing a triboelectric series. Then by choosing as a standard a fabric known to produce little electrostatic charge, such as cotton, one may compare all belts tested and determine which are suitable for use.

Figure 2:
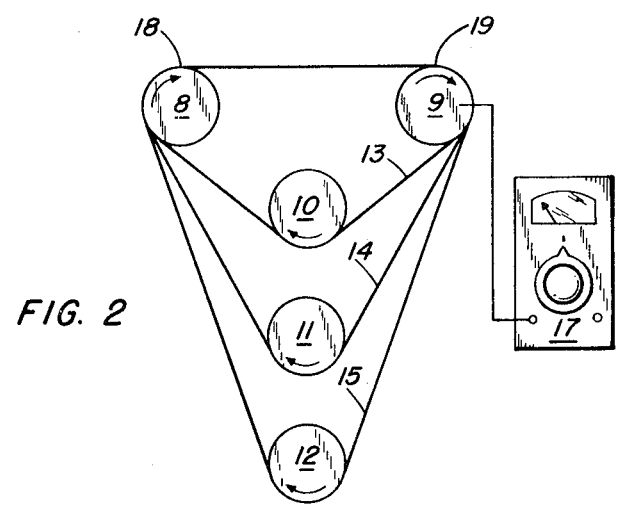
FIG. 2 is a schematic representation of an apparatus in accordance with this invention employed to test a combination of materials.

The alternate embodiment depicted in FIG. 2 uses more than two rollers in a configuration which permits evaluation of many clothing combinations and can simulate an action such as removal of a jacket.

Rollers 8 and 9 are driven at the same rate or only roller 8 may be driven alone provided that belts 13, 14 and 15 will not slip. Roller 9 is insulated from ground and is constructed of a reasonably conducting material, preferably one which simulates human body electrical characteristics; chromium, for example, has been suggested and employed during some tests. Rollers 8, 10, 11 and 12 may be metallic and grounded. Electrometer 17 measures charge build-up on roller 9. Fabric belts 13, 14 and 15 are samples of fabrics to be tested. Each belt may consist of one or more fabric layers. The belts contact each other adjacent roller 8 and remain in contact between points 18 and 19.

As the belts contact each other and pass over the rollers and separate after roller 9 any significant electrostatic charge generated during the contact is passed to roller 9 where the charge is measured by electrometer 17. The belts may still be charged when they reach rollers 10, 11 and 12; therefore, the rollers are grounded to remove any charge and radioactive sources (not shown) may be employed to ensure that the belts are discharged before contacting adjacent roller 8.

Thus, by noting the rate of charge build-up on roller 9 one obtains the electrostatic properties of the combination of fabrics on the rollers. By knowing the area of contact and the belt speed one can predict the charge level to be expected on an individual wearing such a combination after removal of layers of clothing corresponding to fabrics 14 and 15.

Obviously many modifications and variations of the present invention are possible in light of the above teachings. It is therefor to be understood that, within the scope of the appended claims, the invention may be practiced otherwise than as specifically described.

What is claimed is:

1. Apparatus for testing the charge generating characteristics of various materials comprising:
   a plurality of ceramic roller means;
   means for driving said roller means;
   a first endless belt of material surrounding at least two of said roller means;
   a second belt of material having predetermined triboelectric properties circumscribing one said roller means for generating a triboelectric charge on said first endless belt in the vicinity of said one roller means;
   a charge collector adjacent said one other roller means connected to a conductive sphere partially surrounding said one other roller means; and
   an electrometer connected to said sphere for measuring the charge generating characteristics of the material forming the first endless belt.

2. Apparatus for testing the charge generating characteristics of various materials comprising:
   a plurality of roller means;
   means for driving said roller means;
   a first endless belt of material surrounding and contacting three of said roller means;
   a second endless belt surrounding a fourth roller means and said three roller means;
   said second endless belt contact said first endless belt at least at points adjacent two of said three roller means and being of a different material than said first endless belt for generating a triboelectric charge on said first endless belt in the vicinity of one of said two roller means; and
   means at the other of said two roller means for measuring the charge generating characteristics of material forming the first endless belt.

3. The apparatus of claim 2 wherein there are at least four roller means, said first endless belt surrounding and contacting three of said four roller means, and a second endless belt surrounding a fourth roller means and said three roller means, said second endless belt contacting said first endless belt at least at points adjacent two roller means.

4. The apparatus of claim 3 wherein there are at least five roller means, a third endless belt surrounding a fifth roller means and said four roller means, and contacting said second endless belt adjacent said points.

5. The apparatus of claim 4 wherein one of said two roller means comprises a cylinder means for simulating human body conducting characteristics and the remaining roller means are metallic and grounded, and said measuring means comprises a charge collector connected to said cylinder means and an electrometer connected to said charge collector.

6. The apparatus of claim 5 wherein said second endless belt is in intimate contact with said first endless belt and said third endless belt is in intimate contact with said second endless belt between said points.

7. The apparatus of claim 6 wherein at least one of the endless belts is composed of a different material from the others.

8. The method of testing the triboelectric charge generating capacity of various combinations of materials comprising the steps of:
   1. forming at least two endless belts of a material combination to be tested,
   2. arranging said endless belts so they are in contact at least at two points,
   3. grounding said endless belts when they are out of contact,
   4. moving said endless belts simultaneously to allow the endless belts to come into contact at one of said two points and out of contact at the other of said two points,
   5. measuring the charge generated on one of the endless belts in the vicinity of said other of said two points before the endless belts are grounded.

9. The method of claim 8 wherein three endless belts are formed.

* * * * *